(12) United States Patent
Buchschacher

(10) Patent No.: US 6,476,665 B2
(45) Date of Patent: Nov. 5, 2002

(54) SWITCHED-MODE POWER SUPPLY AND DISPLAY

(75) Inventor: Pascal Buchschacher, Mussig (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/734,078

(22) Filed: Dec. 11, 2000

(65) Prior Publication Data

US 2001/0004206 A1 Jun. 21, 2001

(30) Foreign Application Priority Data

Dec. 13, 1999 (EP) .............................................. 99204258
Feb. 1, 2000 (EP) .............................................. 00200333

(51) Int. Cl.[7] ................................................ G05F 3/02
(52) U.S. Cl. ........................................ 327/536; 327/537
(58) Field of Search ................................ 327/534, 536, 327/537

(56) References Cited

U.S. PATENT DOCUMENTS

| | | | | |
|---|---|---|---|---|
| 5,337,284 A | * | 8/1994 | Cordoba et al. ............ 327/534 |
| 5,587,683 A | | 12/1996 | Kawasaki et al. .......... 327/538 |
| 5,932,938 A | | 8/1999 | Schimamori ................ 307/125 |
| 6,052,022 A | * | 4/2000 | Lee ............................ 327/536 |

* cited by examiner

Primary Examiner—Terry D. Cunningham
(74) Attorney, Agent, or Firm—Jack D. Slobod

(57) ABSTRACT

The invention relates to a switched-mode power supplying for a varying load in consecutive cycles of an operation period. Such a varying load may be, for example, a liquid crystal display device. The switched-mode power supply comprises converting means for converting an input voltage into an output voltage and control means arranged to generate a control signal for controlling the converting means. When chip-on-glass technology is used, parasitic resistances may introduce a lag in the output voltage regulation. In order to reduce the lag of the output voltage, the control means comprises memory means for storing status information corresponding to the load level relating to the switching pattern of the converting means in consecutive cycles, and the control means are arranged to generate the control signal from the retrieved status information.

8 Claims, 2 Drawing Sheets

SWITCHED-MODE POWER SUPPLY AND DISPLAY

Figure 1:
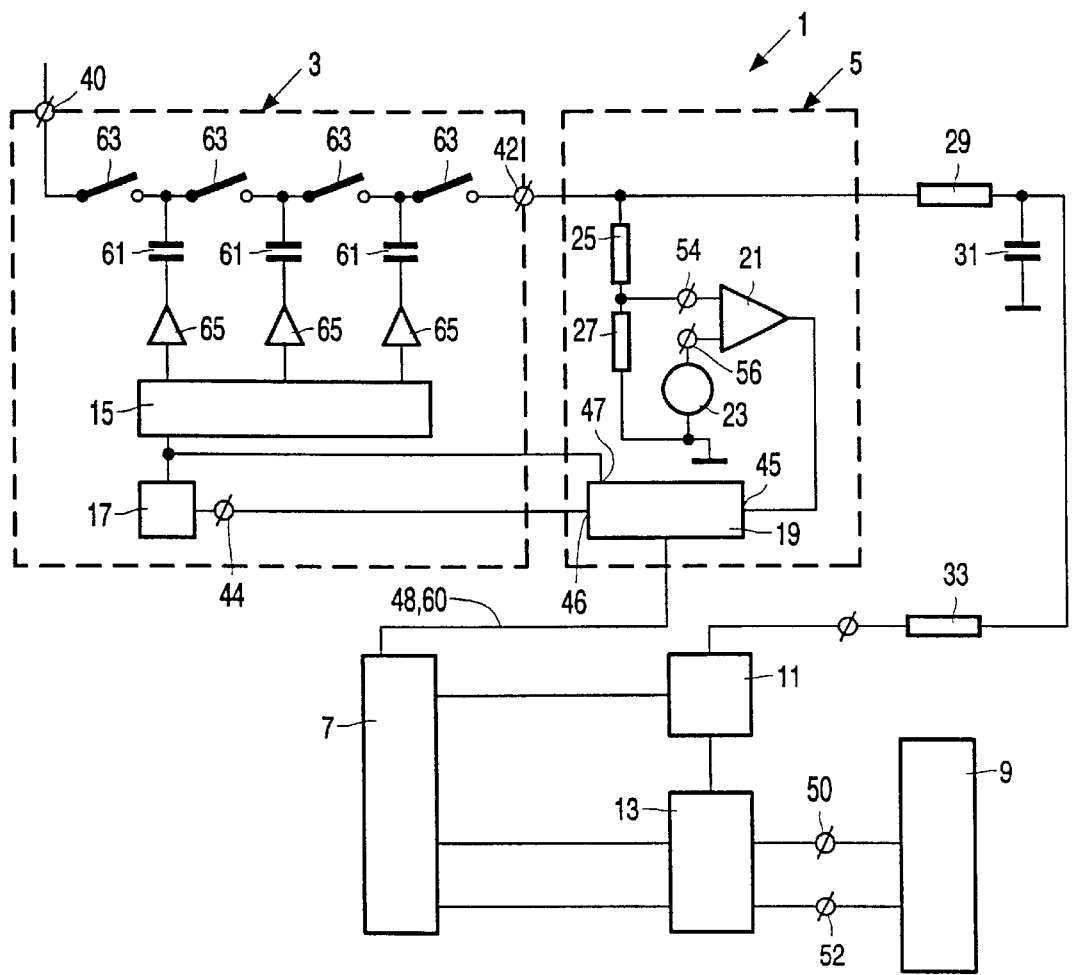

The invention relates to a switched-mode power supply as defined in the preamble of claim 1. The invention further relates to a display system using such a power supply. The power supply may be used in small personal communication or information equipment, for example, portable telephones or pagers.

A switched-mode power supply is known from U.S. Pat. No. 5,587,683. The power supply described in this document is used in a liquid crystal display device. The switched-mode power supply comprises converting means for converting an input voltage into an output voltage Vlcd. The output voltage Vlcd is the highest voltage needed for the multiplexed driving of the liquid crystal display device. Furthermore, the switched-mode power supply comprises control means for generating a control signal for the converter in dependence on a feedback signal and a feed-forward signal. The feedback signal is dependent on the output voltage Vlcd and a reference voltage. Furthermore, a bias level generator and a multiplexing circuit are present for generating a row and a column signal from the output voltage Vlcd and the information to be displayed. The row and column signals are used for driving the liquid crystal display. When a new row of the liquid crystal display is selected, a peak current is drawn from the bias level generator and a voltage dip occurs for a short time in the output voltage Vlcd. In order to adapt quickly to changes in the load of the liquid crystal device caused by different states of the row and column signal, the feed-forward signal is derived from a change in the row signal or a change in the column signal. This feed-forward signal is used for improving the feedback regulation of the liquid crystal drive voltage. However, in liquid crystal display devices, chip-on-glass technology may be used for the power supply, control circuits, the bias level generator and the multiplexing circuit. In that case, parasitic track resistance of indium tin oxide (ITO) conductors between these circuits may add an additional time constant to the feedback signal in the Vlcd feedback loop. Due to the transfer characteristic of the ITO tracks on the liquid crystal device, it may take some time before the output voltage is back at the required level. In this situation, the regulation may introduce some lag when the load varies during consecutive rows, which may affect the grey value and color of the liquid crystal display.

It is an object of the invention to provide a switched-mode power supply in which the lag of the output voltage regulation is reduced. This object is achieved by the switched-mode power supply according to the invention as defined in claim 1. When the control means has a priori information when and how the load changes at the beginning of each consecutive cycle, for example, the row periods of a multiplexed liquid crystal display, the feed-forward signal can be retrieved, corresponding to an expected load level in accordance with a suitable switching pattern of the converter. The invention is based on the recognition that the variation of the load during successive cycles exhibits the same pattern during a period which is long compared to the operation period. For example, in certain applications of liquid crystal displays, the information content of the display is constant during a period which is generally much longer than a frame period with which the liquid crystal display is refreshed. The varying load level may be a priori known by, for example, a display sequencer means. Information of the display sequencer means can thus be used for determining the feed-forward signal.

Further advantageous embodiments of the invention are defined in the dependent claims.

A particular embodiment of the invention is defined in claim 2. By using the combination of the feed-forward signal and a feedback signal, an efficient regulation is obtained.

A further embodiment of the power supply according to the invention is defined in claim 3. Generating a feed-forward signal, which is smaller than the predetermined running period of the control signal, ensures a stable and converging regulation of the power supply.

A further embodiment of the power supply according to the invention is defined in claim 4. The switching information of, for example, the subsequent line periods during the frame period of the display can be stored in the circular memory and retrieved by incrementing the read address each cycle.

A further embodiment of the power supply according to the invention is defined in claim 5. By application of the acquisition means, the status information of the varying load level can be acquired, so that an optimal switching pattern of the switched-mode power supply can be obtained for each subsequent cycle.

A further embodiment of the power supply according to the invention is defined in claim 6. By generating the feed-forward signal in dependence on the frame signal, a higher peak current during, for example, a frame inversion of the liquid crystal display can be compensated for.

The invention further relates to a display system.

It is an object of the invention to provide a display system for displaying grey scale and colors with a high multiplex ratio. This object is achieved by a display device according to the invention as defined in claim 8.

These and other aspects of the invention are apparent from and will be elucidated with reference to the embodiments described hereinafter.

Figure 2:
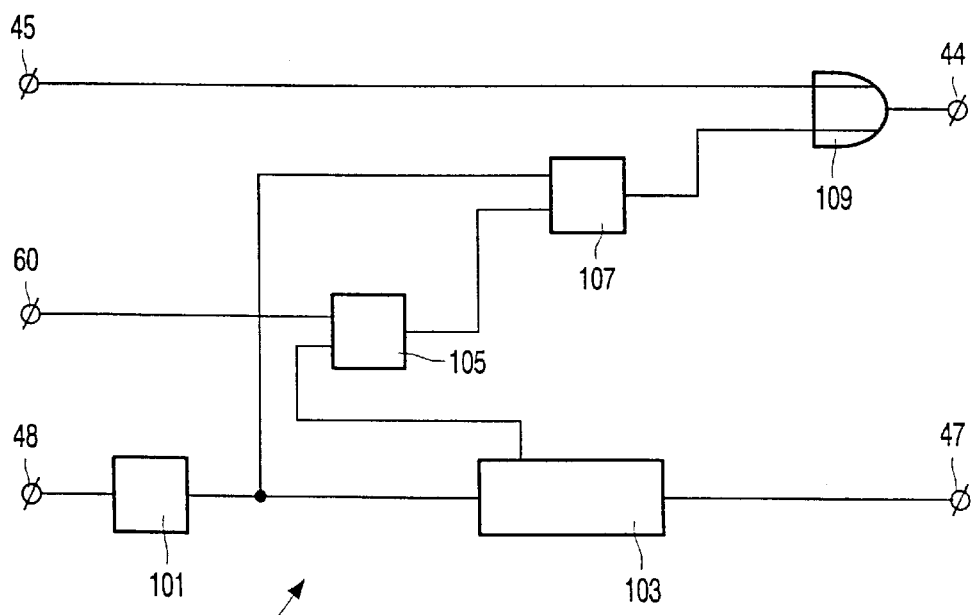
Figure 3:
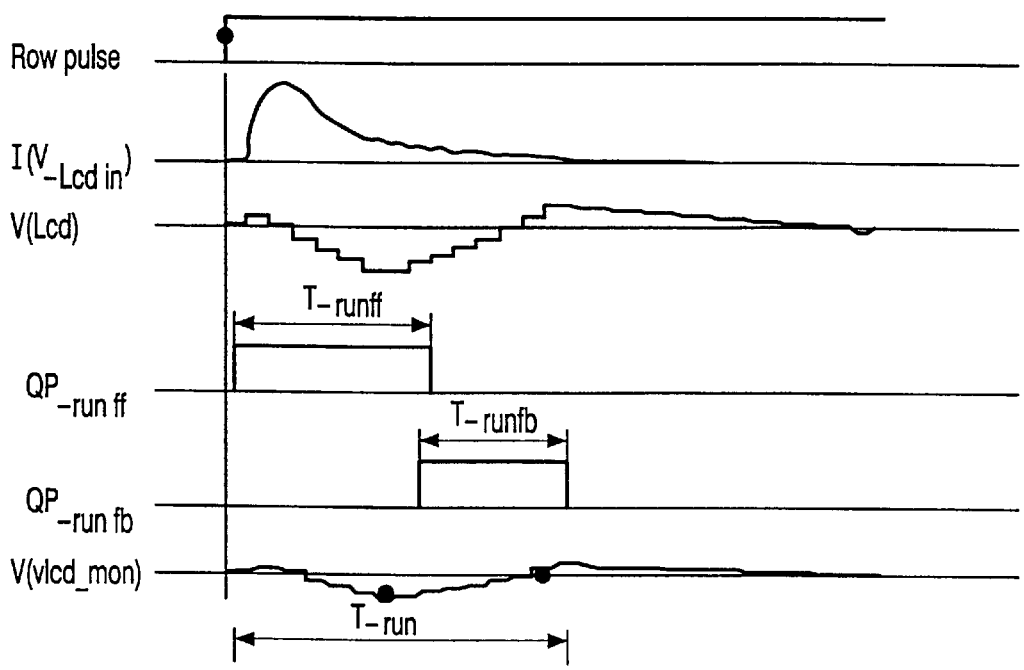
Figure 4:
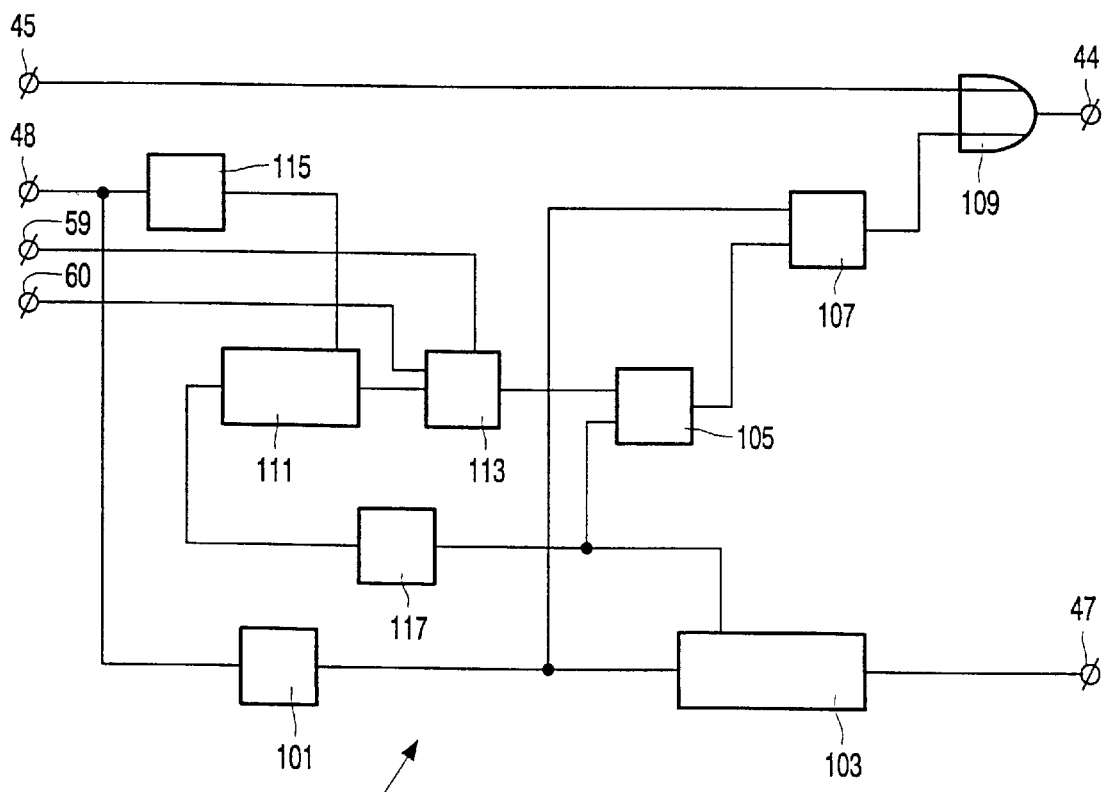

In the drawings:

FIG. 1 shows a first embodiment of the power supply and display system according to the invention, FIG. 2 shows a first example of a control means of the power supply according to the invention, FIG. 3 shows a regulation characteristic of the control means and FIG. 4 shows a second example of a control means of the power supply according to the invention.

FIG. 1 shows a display system according to the invention. The display system comprises a switched-mode power supply 1, for example a charge pump 3. The charge pump circuit is known per se from the cited U.S. Pat. No. 5,587,683. The charge pump 3 comprises a voltage quadrupler including capacitors 61, solid-state switches 63 and buffers 65 and a charge pump control circuit 15 for controlling the solid-state switches 63 and the phase of the buffers 65. The charge pump 3 preferably, comprises a clock circuit 17 for generating a clock signal, which is sent to the charge pump control circuit 15 when a control signal is present at the control input terminal 44.

In operation, an input voltage present at an input terminal 40 of the switchedmode power supply 3 is converted into an output voltage V_lcd present at the output terminal 42. Furthermore, the switched-mode power supply 1 comprises converter control means 5. The converter control means 5 has a reference terminal 56 for receiving a reference voltage and a control terminal 54 coupled via a resistive voltage resistor divider 25,27 to the output terminal 42 for sensing the output voltage V_lcd. Furthermore, the converter control means 5 comprises a comparator circuit 21 and an output terminal 46 for supplying the control signal to the clock circuit 17. A first input of the comparator circuit 21 is connected to the control terminal 54, a second input of the comparator circuit 21 is coupled via the reference terminal 56 to a reference voltage source 23. The output of the comparator circuit 21 is coupled to a first input 45 of a control logic circuit 19. The comparator circuit generates a feedback signal in dependence on the voltages at the control terminal 54 and the reference terminal 56 respectively. The control logic circuit 19 preferably combines the feedback signal and a feed-forward signal in the control signal which is supplied via the control terminal 46 to the clock circuit 17 of the charge pump 3. In operation, the comparator circuit 21 generates the feedback signal when the output voltage V_lcd is lower than a predetermined voltage Vop, which can be adjusted by the resistive voltage divider 25, 27.

Furthermore, the display system comprises a liquid crystal display 9, a bias level generator 11, row and column multiplexers 13 and liquid crystal display control means, for example a display sequencer 7. The display sequencer 7, the charge pump 3, the control means 5, the bias level generator 11 and the row and column multiplexers 13 may be integrated into a single integrated circuit. However, because of its high volume, the charge pump output capacitor 31 is usually not integrated and preferably mounted off-glass via two tracks 29,33 of indium tin oxide (ITO).

The liquid crystal display 9 comprises two optically transparent plates (not shown) between which a liquid crystal layer is provided. Furthermore, the liquid crystal panel is provided with a two-dimensional array of pixels, which are driven by means of, for example, electrodes. The bias level generator 11 generates the row and column driving voltages for multiplexed driving of the liquid crystal display 9 from the voltage V_lcd in present one of the terminals of the bias level generator 11. Multiplexed driving of liquid crystal displays is known per se from the cited U.S. Pat. No. 5,587,683.

The presence of the ITO tracks adds an additional parasitic time constant in the V_lcd regulation loop, because the actual voltage V_lcd in is obtained from V_lcd out via said time constant. This time constant comprises an LCD capacitance 31 and the parasitic ITO resistances 29,33 of the tracks. This may reduce the contrast of the liquid crystal display 9.

Furthermore, the display sequencer 7 controls the cycles or row periods and the operation period or frame period, which frame period comprises multiple row periods where the load of the liquid crystal display varies in consecutive row periods. In operation, the display sequencer 7 sends column data and row signals to the chip-on-glass row and column multiplex circuits 13. The row signal from the display sequencer 7 changes at a frequency given by F_row=F_frame×n_row, wherein F_row represents the row frequency at which the sequential rows of the liquid crystal display 9 are addressed, F_frame represents the operating or frame frequency at which the row information is updated and n_row represents the number of rows of the liquid crystal display.

For example, in a mobile phone display, the frame frequency Fframe is 80 Hz. The number of lines nrow is 85 and the row frequency Frow is 6.8 kHz.

An efficient regulation is obtained when the charge pump 3 starts at the beginning of each row signal, as most of the current of the liquid crystal display is sunk by the bias level generator 11 at the beginning of each row signal. Therefore, when the display sequencer 7 generates a new row signal, the control logic circuit means 19 generates the control signal at the beginning of each row signal during a running period T_run. To this end, the control logic circuit 19 is arranged to generate the control signal from a combination of a feed-forward signal based on the retrieved state information and the feedback signal. The feed-forward signal is generated during a first interval T_runff. The feedback signal is generated during a second interval T_runfb. The length of the first interval T_runff is indicated by a pump coefficient and depends on the load of the bias level generator 11 and on the output voltage V_lcd at the beginning of each row period.

When the feed-forward signal is not applied, the output voltage V_lcd drops after a time constant 96_lcd due to the finite ITO resistance of the tracks on the liquid crystal display. The comparator 21 senses this voltage drop of the voltage V_lcdmon at terminal 54 with a delay $\tau$V_lcdmon due to the transfer characteristics of the resistive voltage divider 25,27 at terminal 54. The resistors of the resistive voltage divider are typically in the mega-Ohm range and therefore the feedback regulation is not very fast. The regulation thus lags and the charge pump 3 starts compensating the output voltage V_lcd only after the above-mentioned time constants. By generating the feed-forward-signal during a first interval T_runff, the charge pump 3 starts running exactly or slightly before the beginning of the row signal, thus regulating the output voltage V_lcd before the feedback signal is generated by the comparator 21.

In order to store and retrieve status information of either the feed-forward signal, the length of the interval T_runff or of the sum of the feed-forward and feedback signal, the length of interval T_ran or the pump coefficient of the load for a given row period, the converter control means 5 comprises a memory, for example, a RAM memory for storing information of the instant when the charge pump 3 starts running in advance of the load peak during each row period.

FIG. 2 shows a first example of the control logic circuit 19 of the converter control means 5 for generating the control signal. The control logic circuit 19 comprises a first positive edge trigger circuit 101, an up-counter 103, a digital comparator 105, a set-reset flip-flop 107 and an or-gate 109. An output of the first trigger circuit 101 is coupled to a reset input of the counter 103, a clock input 47 of the counter 103 is coupled to an output of the clock generator 17 of the charge pump 3. An output of the counter 103 is coupled to a first input of the digital comparator 105 and a second input of the digital comparator 105 is coupled via a terminal 60 to the display sequencer 7 for storing the pump coefficient in the digital comparator 105. A set input of the set-reset flip-flop 107 is coupled to the output of the first trigger circuit 101 and a reset input of the set-reset flip-flop 107 is coupled to an output of the digital comparator 105. Furthermore, a first input of the or-gate 109 is coupled to an output of the set-reset flip-flop 107 and a second input of the or-gate 109 is coupled to feed-back terminal 45 for receiving the feed-back signal. An output of the or-gate 109 is coupled to the control terminal 44 of the clock circuit 17 of the charge pump 3.

In operation, the display sequencer 7 generates a row signal at the beginning of each row, which trigger circuit 101 and retrieves a pump coefficient, which is stored in the second input of the digital comparator 105. Then, the first trigger circuit 101 generates a first pulse for resetting the counter 103. Furthermore, the row pulse sets the set-reset flip-flop 107 so that the feed-forward signal is generated at the output of the set-reset flip-flop 107. On receiving the feed-forward signal at the first input, the or-gate 109 generates the control signal, which is sent to the clock circuit 17 of the charge pump 3.

When the value at the first input of the digital comparator 105 becomes equal to the pump coefficient present at the second input of the digital comparator 105, the digital comparator 105 generates a reset signal and sends it to the reset input of the set-reset flip-flop 107. The output of the set-reset flip-flop 107 is then reset. The first input of the or-gate 109 will become zero. If, at that instant, a feedback signal from the comparator 21 is present at the second input of the or-gate 109, the or-gate 109 generates the control signal so as to ensure a normal feedback regulation of the output voltage V_lcd. When the output voltage V_lcd is at the desired level, the control signal is reset after a running period T_run. In order to obtain a stable regulation of the output voltage V_lcd, the end of the interval T_runff should occur before the end of the interval T_runfb.

FIG. 3 shows a regulation characteristic of the regulation means of the switched-mode power supply according to the invention. The rows in FIG. 3 indicate, from the top row to the bottom row, the row signal, the load current I_Vlcdin, the output voltage V_lcd, the feed-forward signal QP_runff, the feedback signal QP_runfb and the voltage V_lcdmon at the control terminal 54, respectively. The row pulse 48 triggers the generation of the feed-forward signal at the output of the set-reset flipflop 107 and the or-gate 109 generates the control signal. The feed-forward signal QP_runff is generated during a first predetermined period T_run depending on the load of the row period. After an interval r_LCD, the voltage V_lcdmon at the second terminal 54 of the comparator 21 becomes smaller than the reference voltage V_ref and the comparator 21 generates a feedback signal. The feedback signal QP_runfb is generated during a second period T_runfb. The control signal is then generated during a running period T_run being the sum of the first predetermined period Tnmff and the second period T_runfb.

Two pump coefficients are preferably used, a first pump coefficient for the first row of the liquid crystal display, when a frame inversion occurs and a higher load occurs compared to the load of the other rows, and a second pump coefficient for the other row pulses. The first pump coefficient will then be larger than the second pump coefficient. In practice, it is not easy to estimate this pump coefficient, which should therefore be software programmable. Furthermore, the pump coefficients also depend on the information content of the display. In order to improve the estimates of the pump coefficients, the converter control means 5 of the charge pump 3 according to the invention comprises acquisition means for acquisition of the pump coefficients from the running period Trun of the control signal.

FIG. 4 shows a second example of the control logic circuit 190 of the charge pump 3 for acquisition of the pump coefficients. The control logic circuit 190 comprises the positive edge trigger circuit 101, the logic up-counter 103, the digital comparator 105, the setreset flip-flop 107 and the or-gate 109 similarly as in the control logic circuit 19 of the converter control means 3 shown in FIG. 2. Furthermore, the control logic circuit 190 comprises cyclic memory means 111, a second trigger circuit 115 and a digital selection circuit 113. An input of the cyclic memory 111 is coupled via a binary shifter 117 to the output of the counter 103. Furthermore, an output of the cyclic memory 111 is coupled to a first input of the digital selection circuit 113. When the selection signal 59 is activated a new pump coefficient can be presented by the display sequencer 7 to a second input of the digital selection circuit 113.

In operation, the cyclic memory 111 calculates, for each subsequent row-pulse, an actual read address to retrieve the pump coefficient of the corresponding row from the calculated memory position and stores the pump coefficient via the selection circuit 113 in the second input of the digital comparator 105. Furthermore, the same read addresses are calculated after a number of row pulses which is equal to the number of rows during the frame period of the liquid crystal display. Also new estimated pump coefficients corresponding to the real load of the rows are stored in the cyclic memory 111 at the end of each row period. This can be done because the up-counter 103 is running during the interval T_run and therefore holds the number of pumping cycles used after the end of the row period, which number represents the real pump coefficient. At the end of the row period, the actual value of the counter 103 (after division of the shifter 177) is therefore stored in the cyclic memory 111 by means of a signal generated by the negative edge detector 1I15. As the same address of the cyclic memory 111 is still selected, this overwrites the previous pump coefficient with the newly acquired pump coefficient. In the next frame, this pump coefficient is then used as feed-forward pump coefficient.

In order to obtain a convergent regulation, the new pump coefficient should be smaller than the running period T_run of the control signal. Therefore, the binary shifter 117 divides the counted value of the counter 103 by two and sends it to the input of the cyclic memory 111. Also divisions other than by a power of 2 can be made by the binary shifter, for example, ¼ or ⅛.

When the load of a given row is expected to change, for example, because new information has to be displayed, the display sequencer 7 can enforce the acquisition of a new pump coefficient by sending a new coefficient signal via the digital selection means 113 to the first input of the digital comparator 105. The values of the new coefficient signal 60 are preferably software programmable, as in the embodiment of FIG. 2. Alternatively, a coefficient value of zero can be used, which means that the input signal 60 can be omitted and the second input of the digital selection circuit 113 is set to ground.

Furthermore, in order to obtain a synchronous regulation scheme, the display sequencer 7, the control circuit 19 and the charge pump control logic 15 have to be connected to the same clock.

It should be noted that the above-mentioned embodiments illustrate rather than limit the invention, and that those skilled in the art will be able to design many alternative solutions without departing from the scope of the claims.

Furthermore, the switched-mode power supply may be applied in various other electronic devices showing a periodically varying load during consecutive cycles of an operation period, like, for example, pagers and personal organizers.

What is claimed is:

1. A switched-mode power supply for periodically varying loads in consecutive cycles of a predetermined operation period, the switched-mode power supply comprising:

converting means for converting an input voltage into an output voltage, control means for supplying a control signal to the converting means, the control means being arranged to generate a control signal depending on a change of the load level in consecutive cycles, characterized in that the control means comprises memory means for storing status information relating to a switching pattern of the converting means corresponding to the load level in consecutive cycles during the operation period, in that the control means are arranged to retrieve the status information corresponding to the load level of a cycle and determine the control signal in dependence on the retrieved status information.

in that the switched-mode power supply comprises clock-generating means coupled to the control means for supplying a clock signal to the control means, and in that the control means comprises a counting means coupled to a circular memory means arranged to count the number of clock periods of the clock period during the running period, the control means being further arranged to derive the acquired status information derived from the counted number of clock periods.

2. A switched-mode power supply as claimed in claim 1, characterized in that the control signal is dependent on a feed-forward signal which is indicative of the change of load and a feedback signal dependent on the output voltage.

3. A switch-mode power supply as claimed in claim 1, characterized in that the control means are arranged to generate the feed-forward signal during a predetermined first period corresponding to the retrieved status information, the predetermined first period of the feed-forward signal being smaller than the predetermined running period of the control signal.

4. A switched-mode power supply as claimed in claim 1, characterized in that the memory means comprises circular memory means for storing and retrieving respective status information of the consecutive cycles of the periodically varying load during the operation period wherein, after a predetermined number of consecutive cycles, a further address being identical with the first read address is to be determined.

5. A switched-mode power supply as claimed in claim 4, characterized in that the control means comprises acquisition means for acquisition of new status information corresponding to the respective consecutive cycles.

6. A switched-mode power supply as claimed in claim 1, characterized in that the control means are arranged to determine the feed-forward signal in dependence on the clock signal, the retrieved status information and a frame signal, which frame signal has a first value representing a first cycle of the operation period and a second value representing the other cycles of the operation period.

7. A switched-mode power supply as claimed in claim 1, characterized in that the converter means comprises a charge pump device coupled to the clock-generating means.

8. A display system comprising a switched-mode power supply as claimed in claim 1.

* * * * *